(12) United States Patent
Tochigi et al.

(10) Patent No.: US 8,416,381 B2
(45) Date of Patent: *Apr. 9, 2013

(54) ANTI-GLARE FILM WITH CONCAVE-CONVEX STRUCTURE

(75) Inventors: Kae Tochigi, Tokyo (JP); Yusuke Tochigi, Tokyo (JP); Yasushi Yabuhara, Tokyo (JP)

(73) Assignee: Toppan Printing Co., Ltd. (JP)

( * ) Notice: Subject to any disclaimer, the term of this patent is extended or adjusted under 35 U.S.C. 154(b) by 593 days.

This patent is subject to a terminal disclaimer.

(21) Appl. No.: 12/690,800

(22) Filed: Jan. 20, 2010

(65) Prior Publication Data

US 2010/0182551 A1     Jul. 22, 2010

(30) Foreign Application Priority Data

Jan. 21, 2009 (JP) ................................. 2009-010669
Dec. 25, 2009 (JP) ................................. 2009-294410

(51) Int. Cl.
*G02F 1/1335* (2006.01)
*G02B 27/00* (2006.01)

(52) U.S. Cl. ........... 349/137; 349/96; 349/112; 359/601

(58) Field of Classification Search ................... 349/137, 349/96, 112; 359/601, 609
See application file for complete search history.

(56) References Cited

U.S. PATENT DOCUMENTS

2002/0085284 A1* 7/2002 Nakamura et al. ............ 359/601
2006/0198021 A1* 9/2006 Fukuda et al. ................ 359/490
2007/0103786 A1* 5/2007 Muramatsu .................... 359/599
2008/0174875 A1* 7/2008 Iwata et al. .................... 359/599
2008/0212005 A1* 9/2008 Miyauchi et al. ............. 349/137
2010/0238384 A1* 9/2010 Tochigi et al. .................. 349/96

FOREIGN PATENT DOCUMENTS

| JP | 06-018706 | 1/1994 |
|----|-----------|--------|
| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-260748 | 9/2003 |
| JP | 2004-004777 | 1/2004 |

* cited by examiner

*Primary Examiner* — Michael Caley
(74) *Attorney, Agent, or Firm* — Squire Sanders (US) LLP

(57) ABSTRACT

The present invention provides an anti-glare film which has not only <1> sufficient anti-reflection property but also <2> a high level of contrast and <3> strong anti-glare properties and can be applied on a surface of various display devices such as a note PC, a desktop PC and a TV monitor. The anti-glare film of the present invention includes an anti-glare layer which has concavities and convexities on the surface, a haze according to JIS-7105-1981 in the range of 1.0-5.0%, and an average interval between concavities and convexities on the anti-glare layer surface Sm according to JIS-B0601-1994 in the range of 10-150 μm.

5 Claims, 4 Drawing Sheets

ANTI-GLARE FILM WITH CONCAVE-CONVEX STRUCTURE

CROSS REFERENCE TO RELATED APPLICATION

This application is based on and claims the benefit of priority from the Japanese Patent Applications number 2009-010669, filed on Jan. 21, 2009; and 2009-294410, filed on Dec. 25, 2009, the entire contents of which are incorporated herein by reference.

BACKGROUND OF THE INVENTION

1. Field of the Invention

The present invention relates to an anti-glare film that can be provided on the surface of a window or a display device. In particular, the invention relates to an anti-glare film that can be provided on the surface of a display device such as a liquid crystal display (LCD), a CRT display, an organic electroluminescent display (ELD), a plasma display (PDP), a surface emission display (SED) and a field emission display (FED) etc.

2. Description of the Related Art

In the field of display devices such as liquid crystal displays, CRT displays, EL displays and plasma displays, an anti-glare film having a concave-convex structure on the surface is known to be provided on the display surface in order to prevent the decrease in visibility caused by reflection of external light on the display surface during viewing.

For example, the following techniques are known as a manufacturing method of an anti-glare film.

A method for forming a concave-convex structure on the surface of an anti-glare film by emboss-processing.

A method of forming a concave-convex structure on the surface of an anti-glare film by coating a coating liquid in which particles are admixed to a binder matrix and dispersed in the binder matrix. In the anti-glare film in which a concave-convex structure is formed on the surface by such methods, since the external light falling on the anti-glare film is scattered by the concave-convex structure of the surface so that the image of external light becomes blurred, the decrease in visibility caused by reflection of external light on the display surface can be prevented.

A variety of techniques are disclosed with respect to anti-glare films having a concave-convex structure on the surface (Patent document 1) including the following techniques, for example.

A technique using a combination of a binder matrix resin, spherical particles and irregular shape particles (Patent document 2).

A technique using a binder matrix resin and particles of a plurality of different diameters (Patent document 3).

A technique in which the cross-sectional area of concavities is specified when using an anti-glare film having surface concavities and convexities (Patent document 4).

In addition, the following techniques are also disclosed.

a technique using internal scattering together with surface scattering, setting the internal haze value (cloudiness) of the anti-glare layer to 1%-15% and setting the surface haze value (cloudiness) to 7%-30% (Patent document 5).

a technique using a binder resin and particles with a diameter of 0.5 μm to 5 and setting the difference in refractive index between the binder resin and the particles to the 0.02 to 0.2 range (Patent document 6).

a technique using a binder resin and particles with a diameter of 1 μm to 5 μm, setting the difference in refractive index between the binder resin and the particles to 0.05-0.15, using an appropriate solvent, and setting the surface roughness within a predetermined range (Patent document 7).

A technique using a binder matrix resin and a plurality of types of particles and setting the difference in refractive index between the resin and the particles to 0.03-0.2 (Patent document 8).

a technique for setting the surface haze (cloudiness) to a value equal to or greater than 3 and setting the difference between a haze in the normal direction and a haze in the direction at ±60° to a value equal to or less than 4 in order to reduce a fall in contrast and a change in hue etc. when changing the angle of field of view (Patent document 9).

Anti-glare films of various configurations developed to attain a variety of objects have thus been disclosed. The performance of anti-glare films used on the front surface of a display device differs between the displays. In other words, an optimum anti-glare film differs depending on the object of use and resolution etc. of the display device. Therefore, anti-glare films of various types corresponding to a variety of objects are needed.

<Patent document 1> JP-A-H06-018706
<Patent document 2> JP-A-2003-260748
<Patent document 3> JP-A-2004-004777
<Patent document 4> JP-A-2003-004903
<Patent document 5> JP-A-H11-305010
<Patent document 6> JP-A-H11-326608
<Patent document 7> JP-A-2000-338310
<Patent document 8> JP-A-2000-180611
<Patent document 9> JP-A-H11-160505

Anti-glare films are arranged on the surface of display devices for a note PC, a desktop PC or a TV. In recent years, display devices for TV are often watched from a distant point by users. Thus, anti-glare films are required to have not only anti-reflection properties which prevent reflection of external light falling in the display but also provide a high level of contrast and visibility to the display devices. In addition, as the resolution of the panel of the display devices becomes higher, it is necessary that a glare phenomenon of the displayed image is suppressed. Improvement of contrast and discouragement of this glare phenomenon, however, stand in a trade-off relationship and are hardly satisfied at the same time.

SUMMARY OF THE INVENTION

The present invention provides an anti-glare film which is applicable to any display surface of a note PC, a desktop PC and a TV, and not only <1> has sufficient anti-reflection properties, but also <2> provides a high level of contrast to the display, and yet <3> strongly reduces a glare phenomenon.

In order to solve the problem described above, a first aspect of the present invention is an anti-glare film which has a transparent substrate and an anti-glare layer, the anti-glare layer being formed on the transparent substrate and having concavities and convexities on the surface, a haze of the anti-glare layer being in the range of 1.0-5.0%, and an average interval between concavities and convexities on a surface of the anti-glare layer being in the range of 10-150 μm.

In addition, a second aspect of the present invention is the anti-glare film according to the first aspect of the present invention, wherein the anti-glare layer includes binder matrix and particles, a difference ($|n_A - n_M|$) between a refractive index of the particles ($n_A$) and a refractive index of the binder matrix ($n_M$) being 0.04 or less.

In addition, a third aspect of the present invention is the anti-glare film according to the second aspect of the present invention, wherein the anti-glare layer includes the particles by a ratio in the range of 0.5-20.0 parts by weight relative to 100 parts by weight of the binder matrix.

In addition, a fourth aspect of the present invention is the anti-glare film according to the second or third aspect of the present invention, wherein the binder matrix includes material which is made from an acrylic material by curing by ionizing radiation and the particles includes methyl methacrylate.

In addition, a fifth aspect of the present invention is the anti-glare film according to any one of the first to fourth aspects of the present invention, wherein an average thickness (H) of the anti-glare layer is in the range of 3-12 μm.

In addition, a sixth aspect of the present invention is an LCD having the anti-glare film according to any one of the first to fifth aspects of the present invention, a first polarizing plate, a liquid crystal cell, a second polarizing plate and a backlight unit, wherein the anti-glare layer is arranged on the surface of the observer's side.

In addition, a seventh aspect of the present invention is a polarizing plate having the anti-glare film according to any one of the first to fifth aspects of the present invention, a polarizing layer, and a second transparent substrate, wherein the polarizing layer and the second transparent substrate are arranged on the other side of the anti-glare film from the side on which the anti-glare layer is formed.

In addition, an eighth aspect of the present invention is an LCD having the polarizing plate according to the seventh aspect of the present invention, a liquid crystal cell, a second polarizing plate and a backlight unit, wherein the anti-glare layer is arranged on the surface of the observer's side.

It is possible to obtain an anti-glare film which <1> has sufficient anti-reflection properties, and further <2> provides a display device with a high level of contrast, and <3> strongly prevents glare by applying the present invention.

DESCRIPTION OF REFERENCE NUMERALS AND SIGNS

1: Anti-glare film.
11: Transparent substrate.
12: Anti-glare layer.
120: Binder matrix.
121: Particle(s).
H: Average thickness of anti-glare layer.
2: First polarizing plate.
21: First transparent substrate.
22: Second transparent substrate.
23: First polarizing layer.
3: Liquid crystal cell.
4: Second polarizing plate.
41: Third transparent substrate.
42: Fourth transparent substrate.
43: Second polarizing layer.
5: Backlight unit.
30: Die head.
31: Pipework.
32: Coating liquid tank.
33: Transfer pump.
35: Rotary roll.

DETAILED DESCRIPTION OF THE INVENTION

An anti-glare film of the present invention will be described below.

Figure 1:
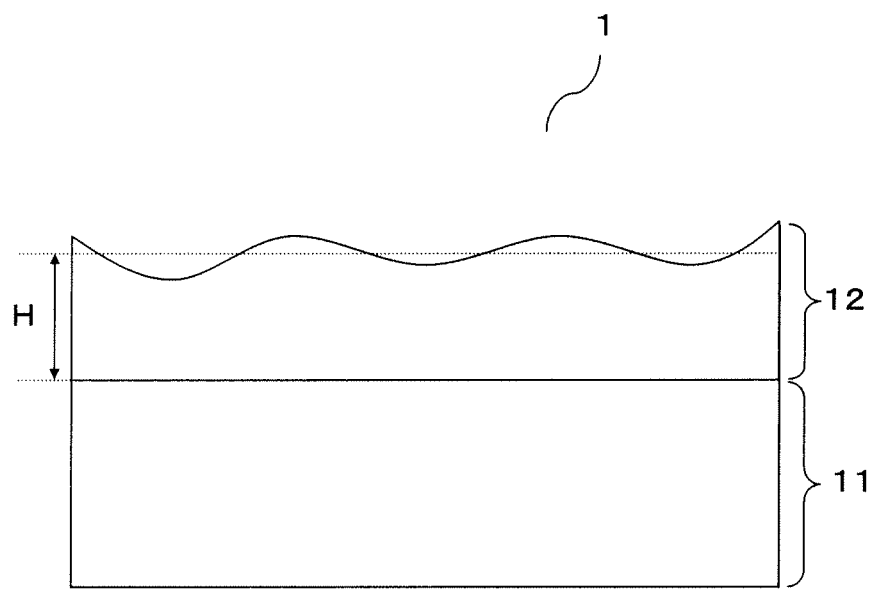
FIG. 1 is a schematic cross-sectional view illustrating an anti-glare film of the present invention.

FIG. 1 shows a cross-sectional view of an anti-glare film of the present invention. An anti-glare film (1) of the present invention has an anti-glare layer (12) on a transparent substrate (11). It is a feature of an anti-glare film of the present invention that a haze of the anti-glare layer is in the range of 1.0-5.0% and an average interval between convexities and concavities on the surface of the anti-glare layer Sm is in the range of 10-150 μm. The haze of the surface of the anti-glare layer in this document is specified by JIS (Japanese Industrial Standard)-K7105-1981. In addition, the average interval between convexities and concavities on the surface of the anti-glare layer Sm is specified by JIS (Japanese Industrial Standard)-B0601-1994.

The inventors found that it is possible to obtain an anti-glare film which not only has sufficient anti-reflection properties but also provides a high level of contrast and prevents glare when applied on a display device by setting the haze Hz according to JIS-K7105-1981 of the anti-glare layer to a value in the range of 1.0-5.0% and the average interval between convexities and concavities on the surface of the anti-glare layer Sm according to JIS-B0601-1994 to a value in the range of 10-150 μm.

In the case where the haze according to JIS-K7105-1981 exceeds 5.0%, the contrast decreases and thus it is impossible to provide an anti-glare film with a high level of contrast. On the other hand, in the case where the haze of the anti-glare layer is less than 1.0%, due to a decrease of ant-reflection properties it is impossible to provide an anti-glare film with a sufficient amount of these properties.

In addition, in the case where the average interval between convexities and concavities on the surface of the anti-glare layer Sm according to JIS-B0601-1994 exceeds 150 μm, the glare phenomenon occurs whereas the Sm according to JIS-B0601-1994 is less than 10 μm, due to a decrease of ant-reflection properties it is impossible to provide an anti-glare film with a sufficient amount of these properties.

By setting the haze of the anti-glare layer to 5.0 or less, it is possible to improve not only the contrast of the display when the anti-glare film is applied on the display device's surface but also the transmittance of the anti-glare layer to light with a wavelength of 550 nm at an incident angle of 5°. In the case where the haze is 5.0 or less, however, moderate concavities and convexities, which have a lens effect and cause glare on the display when the anti-glare film is applied on the display, are supposed to be formed on the surface of the anti-glare layer. The inventors found that it was possible to obtain an anti-glare film having significantly low level of glare along with a high level of contrast and transmittance (to light with a wavelength of 550 nm) by controlling the average interval between concavities and convexities on the anti-glare layer Sm, which became the essence of the present invention.

Conventionally, methods for preventing glare in anti-glare films have been based on scattering transmitted light, whereby the lens effect which causes glare is suppressed. In other words, methods in which the inner haze of the anti-glare layer is enhanced by forming the anti-glare layer using particles which can make a strong light scattering in the anti-glare layer have been used. An addition of particles which can make a strong light scattering in the anti-glare layer, however, causes a magnification of the haze of the entire anti-glare film resulting in a problem of a fall in the contrast. Namely, there is a trade-off relationship between the prevention of glare and the high level of the contrast, which are difficult to attain simultaneously in anti-glare films. In the present invention, an anti-glare film having both a significantly low level of glare and a low haze of 5.0% or less is obtained by controlling the average interval of concavities and convexities on the surface of the anti-glare layer Sm.

The magnitude of the haze of the anti-glare layer can be obtained by subtracting the haze other than the anti-glare layer from the haze of the anti-glare film. In the anti-glare film of FIG. 1, the haze of the anti-glare layer can be obtained by subtracting the haze of the transparent substrate from the haze of the anti-glare film. In the anti-glare film of the present invention, it is possible to raise the transmittance of the anti-glare layer to light with a wavelength of 550 nm at an incident angle of 5° by making the haze of the anti-glare layer 5.0% or less. It is preferable that the transmittance of the anti-glare layer to light with a wavelength of 550 nm is 80% or higher. If the visible light transmittance of the anti-glare film is increased, the luminance of the display device on which the anti-glare film is applied is also increased so that a reduction of energy consumption in the display device is achieved.

Figure 2:
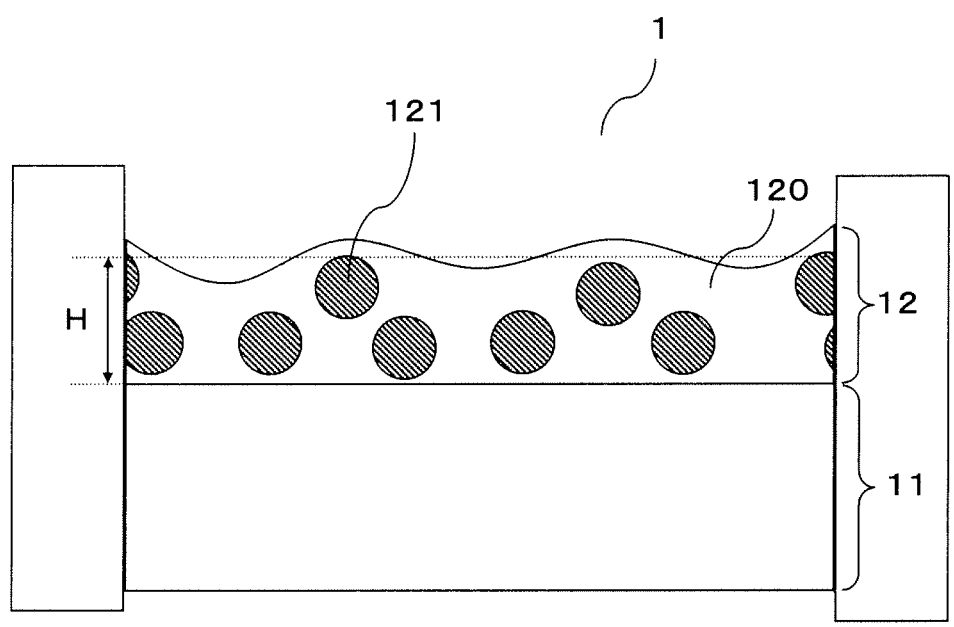
FIG. 2 is a schematic cross-sectional view illustrating an anti-glare film of the present invention.

FIG. 2 illustrates a cross-sectional exemplary diagram of the present invention. The anti-glare film (1) of the present invent has an anti-glare layer (12) on a transparent (11) and the anti-glare layer contains binder matrix (120) and particles (121). It is possible to produce an anti-glare film with fewer defects by forming anti-glare layer admixing particles with binder matrix than in the case of forming an anti-glare layer by an embossing method etc. In the case where an anti-glare film is produced by forming the anti-glare layer by an embossing method etc., defects are periodically produced if there are defects or foreign matters on the embossing mold. In contrast, in the case of the method of forming an anti-glare layer by admixing particles with binder matrix, no such defects are produced and in addition the anti-glare film is manufactured at a low cost.

In the anti-glare film of the embodiment of the present invention, the binder matrix as referred to herein is the component of the anti-glare layer remaining after removing the particles. The material for forming the binder matrix of the embodiment of the present invention is a material remaining after removing the particles from the solid components of the coating liquid for forming the anti-glare layer. Therefore, the material for forming the binder matrix can also include, if necessary, an additive such as a photopolymerization initiator and a surface conditioner (or surface adjusting agent) and also a thermoplastic resin in addition to the ionizing radiation curable material (such as an acrylic material).

It is preferable that the anti-glare film of the present invention has an anti-glare layer including a binder matrix and particles. Moreover, it is preferable that a difference ($|n_A - n_M|$) between the refractive index of the particles ($n_A$) and the refractive index of the binder matrix ($n_m$) is in the 0.00-0.04 range. This is because the scatterings which occur in the anti-glare layer due to the admixed particles are preferred to be small. In the case where the difference exceeds 0.04, the scattering and the haze in the anti-glare layer becomes so large that a display device having an anti-glare film with such an anti-glare layer is liable to have a low level of contrast. It is more preferable that the difference ($|n_A - n_M|$) between the refractive index of the particles ($n_A$) and the refractive index of the binder matrix ($n_M$) is in the 0.00-0.02 range.

The refractive index of the binder matrix ($n_M$) and the refractive index of the particles ($n_A$) can be measured by a Becke line detection method (immersion method).

In addition, it is preferable that the particles content relative to 100 parts by weight of the binder matrix is in the range of 0.5-20.0 parts by weight in the anti-glare film having the anti-glare layer which contains the binder matrix and the particles. It becomes possible to efficiently form the anti-glare layer with desirable haze and average interval between concavities and convexities Sm if the particles content relative to 100 parts by weight of the binder matrix is in this range. It is difficult to provide the anti-glare layer with anti-reflection properties in the case where the particles content is less than 0.5 parts by weight whereas it is difficult to make the anti-glare layer have desirable haze and average interval Sm between concavities and convexities in the case where the particles content exceeds 20.0 parts by weight.

In addition, it preferable in the anti-glare film having the anti-glare layer which contains the binder matrix and the particles that the binder matrix is formed by curing an acrylic material by irradiating ionizing radiation and the particles include methyl methacrylate. Particles of styrene-methyl methacrylate copolymer and particles of methyl methacrylate are examples of such particles. It is possible to provide the anti-glare film with sufficient abrasion resistance for application on a display device by coating an acrylic material as a binder matrix forming material on a transparent substrate and forming the anti-glare layer by irradiating ionizing radiation.

It is preferable that particles containing methyl methacrylate are used as the particles when an acrylic material is used as the binder matrix forming material. In particular, particles of styrene-methyl methacrylate copolymer and particles of methyl methacrylate are preferred to be used. Particles of styrene-methyl methacrylate copolymer and particles of methyl methacrylate can be used well with the binder matrix forming material and it is possible to control a dynamic state of the particles in the binder matrix so that an anti-glare layer having a predetermined haze and average interval Sm between concavities and convexities is efficiently formed.

In addition, it is preferable that the anti-glare layer in the anti-glare film of the present invention has an average thickness (H) in the range of 3-12 μm. In the case where the average thickness of the anti-glare layer is less than 3 μm, the anti-glare film may have insufficient hardness and abrasion resistance for use on a display device surface. On the other hand, in the case where the average thickness of the anti-glare layer exceeds 12 μm, the anti-glare film may be unsuitable for use on a display device surface due to heavy curling of the film and high production costs. It is more preferable that the anti-glare layer has an average thickness in the range of 4-10 μm.

The average thickness (H) of the anti-glare layer in the present invention means the average thickness of the anti-glare layer having surface concavities and convexities. The average thickness can be measured by an electronic micrometer or an automated microfigure measuring instrument. An average thickness (H) cited in this document is obtained as an average value measured at five points. The average particle diameter of the particles in the present invention can be measured by a light scattering particle size distribution analyzer.

If necessary, functional layers having anti-reflection ability, antistatic ability, antifouling ability, electromagnetic shielding ability, infrared radiation absorbing ability, ultraviolet radiation absorbing ability, and color correction ability can be provided on the anti-glare film of the present invention. Examples of such functional layers include an anti-reflection layer, an antistatic layer, an antifouling layer, an electromagnetic shielding layer, an infrared radiation absorbing layer, an ultraviolet radiation absorbing layer, and a color correcting layer. These functional layers may be a single layer or a plurality of layers. The functional layer may have a plurality of functions in one layer, for example, an anti-reflection layer may have antifouling ability. Further, these functional layers may be provided between the first transparent substrate and anti-glare layer or may be provided on the anti-glare layer. In the present invention, a primer layer or an adhesive layer may be provided to improve adhesiveness between the layers.

Figure 3A:
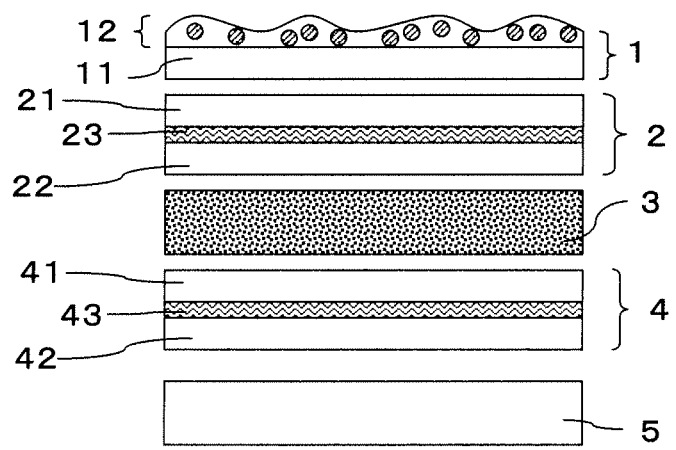
FIG. 3 is a schematic cross-sectional view illustrating a transmission type LCD using an anti-glare film of the present invention.

FIG. 3 illustrates a cross section exemplary diagram of a transmission type LCD using an anti-glare film of the present invention. The transmission type LCD of FIG. 3A has a backlight unit 5, a second polarizing plate 4, a liquid crystal cell 3, a first polarizing plate 2 and an anti-glare film 1 of the present invention in order. The side on which the anti-glare film 1 is arranged is the observer's side, namely, the surface of the display.

The backlight unit 5 includes a light source and a light diffusion plate. The liquid crystal cell has one electrode on one transparent substrate, and another electrode and a color filter on the other transparent substrate. A liquid crystal is inserted between the electrodes (Not shown in FIGs.). Each of the first and the second polarizing plates, which are arranged on both sides of the liquid crystal cell 3, has a combined structure of transparent substrates 21,22,41,42 and polarizing layer 23,43 inserted there between.

Figure 3B:
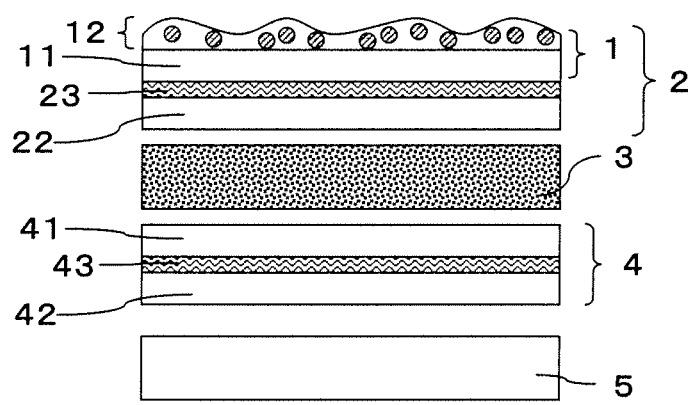

FIG. 3A shows a transmission type LCD in which the transparent substrate 11 of the anti-glare film 1 is separately arranged from the transparent substrate of the first polarizing plate 2. In contrast, FIG. 3B shows an LCD in which the first polarizing layer 23 is arranged on the other side of the transparent substrate 11 of the anti-glare film 1 and the transparent substrate 11 is shared as the transparent substrate of the anti-glare film 1 and as the first transparent substrate of the polarizing plate 2. In other words, a part of the anti-glare film is also a part of the polarizing plate.

In addition, a transmission type LCD of the present invention may include any components besides the anti-glare film, the first polarizing plate, the liquid crystal cell, the second polarizing plate and the backlight unit. Although a diffusion film, a prism sheet, a luminance improving film, which efficiently utilize the light from the backlight unit, and a retardation film, which compensates the phase difference caused by the liquid crystal cell or the polarizing plate etc., are typically used as such components, the present invention is not limited to these.

A method for manufacturing the anti-glare film of the present invention will be described below.

The method for manufacturing the anti-glare film of the present invention includes at least a step of coating a coating liquid for forming the anti-glare layer that includes a material for forming the binder matrix that can be cured by ionizing radiation and the particles on the first transparent substrate and forming a coating film on the first transparent substrate and a curing step of curing the material for forming the binder matrix by ionizing radiation, thereby making it possible to form the anti-glare layer on the first transparent substrate.

Glass or a plastic film can be used as the transparent substrate of the present invention. Any plastic film having appropriate transparency and mechanical strength may be used. Examples of suitable films include polyethylene terephthalate (PET), triacetyl cellulose (TAC), diacetyl cellulose, acetyl cellulose butyrate, polyethylene naphthalate (PEN), cycloolefin polymers, polyimides, polyethersulfones (PES), polymethyl methacrylate (PMMA), and polycarbonates (PC). Among them, a triacetyl cellulose (TAC) film can be advantageously used because it has small birefringence and good transparency. In a case where the anti-glare film of the present invention is provided on the surface of a liquid crystal display, it is especially preferred that a triacetyl cellulose (TAC) film be used as the first transparent substrate. It is preferable that the thickness of the transparent substrate is in the range of 25-200 μm and is more preferable in the range of 40-80 μm.

In addition, a transparent substrate which has an anti-glare layer on one surface thereof and a polarizing layer on the other surface can be used as the polarizing plate of the present invention as is shown in FIG. 3B. In such a case, iodine added elongated polyvinyl alcohol (PVA), for example, can be can be used as the polarizing layer. At this time, the polarizing layer is interposed between the second transparent substrate and the transparent substrate of the anti-glare film.

The coating liquid for forming the anti-glare layer that is used for forming the anti-glare layer at least includes a material for forming the binder matrix which is curable by ionizing radiation and the particles.

For example, an acrylic material which is a material curable by ionizing radiation can be used as the material for forming the binder matrix. A multifunctional (meth)acrylate compound such as an acrylic acid or methacrylic acid ester of a polyhydric alcohol or a multifunctional urethane (meth)acrylate which is synthesized from a diisocyanate and a hydroxyl ester of a polyhydric alcohol and acrylic acid or methacrylic acid can be used as the acrylic material. In addition, a polyether resin, a polyester resin, an epoxy resin, an alkyd resin, a spyroacetal resin, a polybutadiene resin, or a polythiolpolyene resin having an acrylate or methacrylate functional group can be used as the material curable by ionizing radiation.

In the present invention "(meth)acrylate" means both "acrylate" and "methacrylate". For example, "urethane (meth)acrylate" means both "urethane acrylate" and "urethane methacrylate".

Examples of monofunctional (meth)acrylate compounds include 2-hydroxyethyl (meth)acrylate, 2-hydroxypropyl (meth)acrylate, 2-hydroxybutyl (meth)acrylate, n-butyl (meth)acrylate, isobutyl (meth)acrylate, t-butyl (meth)acrylate, glycidyl (meth)acrylate, acryloyl morpholine, N-vinyl pyrrolidone, tetrahydrofurfuryl acrylate, cyclohexyl (meth)acrylate, 2-ethylhexyl (meth)acrylate, isobornyl (meth)acrylate, isodecyl (meth)acrylate, lauryl (meth)acrylate, tridecyl (meth)acrylate, cetyl (meth)acrylate, stearyl (meth)acrylate, benzyl (meth)acrylate, 2-ethoxyethyl (meth)acrylate, 3-methoxybutyl (meth)acrylate, ethylcarbitol (meth)acrylate, phosphoric acid (meth)acrylate, ethylene oxide-modified phosphoric acid (meth)acrylate, phenoxy (meth)acrylate, ethylene oxide-modified phenoxy (meth)acrylate, propylene oxide-modified phenoxy (meth)acrylate, nonylphenol (meth)acrylate, ethylene oxide-modified nonylphenol (meth)acrylate, propylene oxide-modified nonylphenol (meth)acrylate, methoxydiethylene glycol (meth)acrylate, methoxypolyethylene glycol (meth)acrylate, methoxypropylene glycol (meth)acrylate, 2-(meth)acryloyloxy-ethyl-2-hydroxypropyl phthalate, 2-hydroxy-3-phenoxypropyl (meth)acrylate, 2-(meth)acryloyloxyethyl hydrogen phthalate, 2-(meth)acryloyloxypropyl hydrogen phthalate, 2-(meth)acryloyloxypropyl hexahydrohydrogen phthalate, 2-(meth)acryloyloxypropyl tetrahydrohydrogen phthalate, dimethylaminoethyl (meth)acrylate, trifluoroethyl (meth)acrylate, trifluoropropyl (meth)acrylate, hexafluoropropyl (meth)acrylate, octafluoropropyl (meth)acrylate, octafluoropropyl (meth)acrylate, and adamantan derivative (meth)acrylates such as adamantyl acrylate that has a monovalent mono(meth)acrylate derived from 2-adamantan and adamantan diol.

Examples of difunctional (meth)acrylate compounds include di(meth)acrylates such as ethylene glycol di(meth)acrylate, diethylene glycol di(meth)acrylate, butanediol di(meth)acrylate, hexanediol di(meth)acrylate, nonandiol di(meth)acrylate, ethoxylated hexanediol di(meth)acrylate, propoxydized hexanediol di(meth)acrylate, diethylene glycol di(meth)acrylate, polyethylene glycol di(meth)acrylate, tripropylene glycol di(meth)acrylate, polypropylene glycol di(meth)acrylate, neopentyl glycol di(meth)acrylate, ethoxylated neopentyl glycol di(meth)acrylate, tripropylene glycol di(meth)acrylate, and hydroxypyvalic acid neopentyl glycol di(meth)acrylate.

Examples of (meth)acrylate compounds with a functionality equal to or greater than three include trifunctional (meth)acrylate compounds such as tri(meth)acrylates, e.g., trimethylolpropane tri(meth)acrylate, ethoxylated trimethylolpropane tri(meth)acrylate, propoxydized trimethylolpropane tri(meth)acrylate, tris 2-hydroxyethyl isocyanurate tri(meth)acrylate, and glycerin tri(meth)acrylate, and also pentaerythritol tri(meth)acrylate, dipentaerythritol tri(meth)acrylate, and ditrimethylolpropane tri(meth)acrylate, multifunctional (meth)acrylate compounds with a functionality equal to or greater than three include pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate, and multifunctional (meth)acrylate compounds in which some of (meth)acrylates are substituted with an alkyl group or ε-caprolactone.

In addition, compounds obtained by reacting a polyhydric alcohol, a polyisocyanate, and an acrylate containing a hydroxyl group can be used as the urethane (meth)acrylate compound. Examples of specific compounds include UA-306H, UA-306T, and UA-306I manufactured by Kyoeisha Chemical Co., Ltd., UV-1700B, UV-6300B, UV-7600B, UV-7605B, UV-7640B, and UV-7650B manufactured by Nippon Synthetic Chemical Industry Co., Ltd., U-4HA, U-6HA, UA-100H, U-6LPA, U-15HA, UA-32P, and U-324A manufactured by Shin-Nakamura Chemical Co., Ltd., Ebecryl-1290, Ebecryl-1290K, and Ebecryl-5129 manufactured by Daicel-Cytec Company Ltd., and UN-3220HA, UN-3220HB, UN-3220HC, and UN-3220HS manufactured by Negami Chemical Industrial Co., Ltd.

In addition, a thermoplastic resin can be used in addition to the acrylic material that is a material curable by ionizing radiation as the material forming the binder matrix. Examples of suitable thermoplastic resins include cellulose derivatives such as acetyl cellulose, nitrocellulose, acetylbutyl cellulose, ethyl cellulose, and methyl cellulose, vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resin and copolymers thereof and methacrylic resin and copolymers thereof, polystyrene resins, polyamide resins, linear polyester resins, and polycarbonate resins. Adhesion of the first transparent substrate and anti-glare layer can be improved by adding a thermoplastic resin. Further, by adding a thermoplastic resin, it is possible to suppress curling of the manufactured anti-glare film.

In a case where ultraviolet radiation is used as ionizing radiation, a photopolymerization initiator is added to the coating liquid for forming the anti-glare layer. It is preferred that a photopolymerization initiator that is suitable for the material forming the binder matrix be used. Examples of the photopolymerization initiator include benzoin and alkyl ethers thereof such as benzoin methyl ether, benzoin ethyl ether, benzoin isopropyl ether, and benzyl methyl ketal. The amount of the photopolymerization initiator used is 0.5 to 20 parts by weight relative to the binder matrix forming material. The preferred amount is 1 part by weight to 5 parts by weight.

Examples of the particles of the embodiment of the present invention include acrylic particles (refractive index 1.49), acryl styrene particles (refractive index 1.49-1.59), polystyrene particles (refractive index 1.59), polycarbonate particles (refractive index 1.58), melamine particles (refractive index 1.66), epoxy particles (refractive index 1.58), polyurethane particles (refractive index 1.55), nylon particles (refractive index 1.50), polyethylene particles (refractive index 1.50-1.56), polypropylene particles (refractive index 1.49), silicone particles (refractive index 1.43), polytetrafluoroethylene particles (refractive index 1.35), polyfluorovinylidene particles (refractive index 1.42), polyvinyl chloride particles (refractive index 1.54), polyvinylidene chloride particles (refractive index 1.62), and glass particles (refractive index 1.48), silica (refractive index 1.43). In the embodiment of the present invention, particles of a plurality of kinds may be used as the particles.

If necessary, a solvent can be added to the coating liquid for forming the anti-glare layer. By adding a solvent, it is possible to disperse uniformly the particles in the material forming the binder matrix, or when the coating liquid for forming the anti-glare layer is coated on the first transparent substrate, the solution viscosity can be adjusted to an adequate range.

In the present invention, triacetyl cellulose is used as the first transparent substrate, and the anti-glare layer is directly formed on the triacetyl cellulose film, without other functional layers being interposed therebetween. In a case where the anti-glare layer is directly provided, it is preferred that a mixed solvent of a solvent that dissolves the triacetyl cellulose film or causes swelling thereof and a solvent that neither dissolves the triacetyl cellulose film nor causes swelling thereof be used as the solvent for the coating liquid for forming the anti-glare layer. By using the mixed solvent, it is possible to obtain the anti-glare film with sufficient adhesion at the interface of the triacetyl cellulose film (first transparent substrate) and anti-glare layer.

At this time, examples of the solvent that dissolves the triacetyl cellulose film (first transparent substrate) or causes swelling thereof include ethers such as dibutylether, dimethoxymethane, dimethoxyethane, diethoxyethane, propylene oxide, dioxane, dioxolan, tiroxane, tetrahydrofuran, anisole, and penetol, some ketones such as acetone, methyl ethyl ketone, diethyl ketone, dipropyl ketone, diisobutyl ketone, cyclopentanone, cyclohexanone, methyl cyclohexanone, and ethyl cyclohexanone, esters such as ethyl formate, propyl formate, n-pentyl formate, methyl acetate, ethyl acetate, methyl propionate, ethyl propionate, n-pentyl acetate, and γ-butyrolactone, and cellosolves such as methyl cellosolve, cellosolve, butyl cellosolve, and cellosolve acetate. These solvents can be used individually or in combinations of two or more thereof.

Examples of the solvent that neither dissolves the triacetyl cellulose film nor causes swelling thereof include aromatic hydrocarbons such as toluene, xylene, cyclohexane, and cyclohexylbenzene, hydrocarbons such as n-hexane, and some ketones such as methyl isobutyl ketone and methyl butyl ketone. These solvents can be used individually or in combinations of two or more thereof.

In the anti-glare layer of the embodiment of the present invention, an additive that is called a surface conditioner may be added to prevent the occurrence of coating defects such as repelling and unevenness in the anti-glare layer (coating film) that is formed by coating. Depending on the action thereof, the surface conditioner is also called a leveling agent, an antifoaming agent, an interface tension adjusting agent, and a surface tension adjusting agent, but all these agents act to decrease the surface tension of the coating film (anti-glare layer) that is formed.

Examples of additives that are usually used as the surface conditioner include silicone additives, fluoroadditives, and acrylic additives. Examples of suitable silicone additives include derivatives having polydimethylsiloxane as the main chain in which a side chain of the polydimethylsiloxane is modified. For example, a polyether-modified dimethylsiloxane can be used as the silicone additive. Compounds having a perfluoroalkyl group are used as the fluoroadditives. Compounds having a main chain obtained by polymerization of acryl monomer, methacryl monomer, or styrene monomer can be used as the acrylic additives. The acrylic additives may have not only a structure obtained by polymerization of acryl monomer, methacryl monomer, or styrene monomer as the main chain but also a substituent such as an alkyl group, a polyether group, a polyester group, a hydroxyl group, or an epoxy group in side chains.

In addition to the above-described surface conditioner, other additives may be also added to the coating liquid for forming the anti-glare layer of the embodiment of the present invention. However, it is preferred that these additives produce no adverse effect on the transparency and light diffusing ability of the anti-glare layer that is formed. Examples of functional additives include an antistat, an ultraviolet absorber, an infrared absorber, an antifouling agent, a water repellent, a refractive index adjusting agent, an adhesiveness improver, and a curing agent. As a result, functions other than the anti-glare function, such as an antistatic function, an ultraviolet absorption function, an infrared absorption function, an antifouling function, and a water repellent function can be imparted to the anti-glare layer which is formed.

The coating liquid for forming the anti-glare layer of the embodiment of the present invention is coated on the first transparent substrate to form a coating film. A coating method using a roll coater, a reverse roll coater, a gravure coater, a knife coater, a bar coater, or a die coater can be used as a method for coating the coating liquid for forming the anti-glare layer on the first transparent substrate. Among these coaters, a die coater suitable for high-speed coating in a roll-to-roll system is preferably used. The concentration of solids in the coating liquid differs depending on the coating method. The adequate concentration of solids is about 30-70 wt. %.

Figure 4:
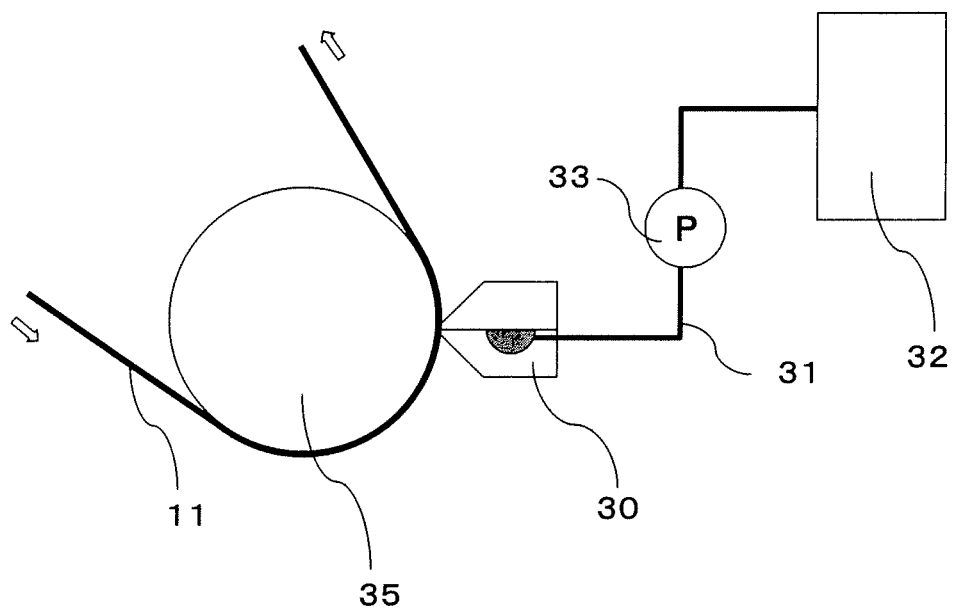
FIG. 4 is a schematic cross-sectional view illustrating a die coater coating device which uses an embodiment of the present invention.

Next, a coating apparatus using a die coater of the embodiment of the present invention is described below. FIG. 4 is a schematic cross-sectional view of the die coater coating apparatus of the embodiment of the invention. The die coater coating apparatus of the embodiment of the invention has a structure in which a die head 30 and a coating liquid tank 32 are connected together with a pipework 31, and the coating liquid for forming the anti-glare layer that is located in the coating liquid tank 32 is pumped by a transfer pump 33 into the die head 30. The coating liquid for forming the anti-glare layer that has been pumped into the die head 30 is ejected from a slit gap, and a coating film is formed on the transparent substrate 11. By using the wound transparent substrate 11 and a rotary roll 35, it is possible to form a coating film continuously on the first transparent substrate by a roll-to-roll system.

The anti-glare layer is formed by irradiating the coating film obtained by coating the coating liquid on the first transparent substrate with ionizing radiation. Ultraviolet radiation or electron beam can be used as the ionizing radiation. In the case of ultraviolet curing, a light source such as a high-pressure mercury lamp, a low-pressure mercury lamp, an ultrahigh-pressure mercury lamp, a metal halide lamp, a carbon arc, or a xenon arc can be used. Further, in the case of electron beam curing, an electron beam emitted from various electron beam accelerators such as a Cockroft-Walton accelerator, a Van de Graaff accelerator, a resonance transformer-type accelerator, an insulating core transformer-type accelerator, a linear accelerator, a dynamitron accelerator, or a high-frequency accelerator can be used. The electron beam preferably has energy of 50-1000 keV. An electron beam having energy of 100-300 keV is more preferred.

Before and/or after a process of forming the anti-glare layer by curing, a drying process may be implemented. Further, curing and drying may be performed simultaneously. In particular, in a case where the coating liquid includes a material of the binder matrix, the particles and the solvent, a drying process has to be implemented before irradiation with ionizing radiation in order to remove the solvent contained in the formed coating film. Examples of suitable drying means are heating, air blowing, and hot air blowing etc.

An anti-glare film of the present invention can be manufactured as described above.

EXAMPLE

Examples are described below.

Example 1

A triacetyl cellulose film (TD-80U made by Fuji Photo Film Corp.) was used as the transparent substrate. 94.5 parts by weight of pentaerythritol triacrylate, which was an ionizing radiation curable acrylic material, as the binder matrix forming material, 5 parts by weight of IRGACURE 184 (a product of Ciba Japan) as the photopolymerization initiator, and 0.5 parts by weight of BYK350 (a product of BYC Japan) as the surface conditioner were prepared as the binder matrix forming material. Particles which were made of styrene-methyl methacrylate copolymer and had 5.0 µm of average diameter and 1.52 of refractive index were used as the particles. In addition, 70 parts by weight of toluene and 30 parts by weight of oxolan were prepared as the solvent. Then, the binder matrix forming material, the particles and the solvent were mixed together to obtain the coating liquid for forming the anti-glare layer. The coating liquid for forming the anti-glare layer was coated on the triacetyl cellulose by a die coater so that a coated layer was obtained. The coated layer was subsequently dried to remove the solvent contained in the coated layer. Then the coated layer was cured by irradiating 400 mJ/cm$^2$ of UV under an atmosphere of an oxygen concentration equal to or less than 0.03% so that the anti-glare film having the anti-glare layer on the transparent substrate was obtained. The average thickness (H) of the resultant anti-glare layer was 7.4 µm.

At this time, the average thickness (H) of the anti-glare layer was measured by an electronic micrometer (K351C made by Anritsu Company). In addition, the refractive index of the particles ($n_A$) was measured by the Becke line detection method (the immersion method). Moreover, the average particle size was measured by a light scattering particle size distribution analyzer (SALD-7000 made by Shimadzu Corp.)

Examples 2-9 and Comparative Examples 1-3

Changing the refractive index of the particles ($n_A$), the average thickness of the anti-glare layer (H) and particles content from <Example 1>, the anti-glare films of <Example 2> to <Example 9> and <Comparative example 1> to <Comparative example 3>. The same binder matrix forming material (acrylic material, photopolymerization initiator and surface conditioner) and the same solvent as in the case of <Example 1> were used in the <Example 2> to <Example 9> and <Comparative example 1> to <Comparative example 3>. In addition, the average particle diameter in the <Example 2> to <Example 9> and <Comparative example 1> to <Comparative example 3> was also the same as in the case of <Example 1>. The same die coater was used and the same drying condition and UV irradiation condition was adopted to make the anti-glare film (except for the coating condition to realize various average thickness of the anti-glare layer (H)) in <Example 1> to <Example 9> and <Comparative example 1> to <Comparative example 3>.

Table 1A and 1B show the refractive index of the binder matrix ($n_M$), refractive index of the particles ($n_A$), the average thickness of the anti-glare layer (H) and the particle content in <Example 1> to <Example 9> and <Comparative example 1> to <Comparative example 3>.

TABLE 1A

| | Binder matrix forming material | | | | | | |
|---|---|---|---|---|---|---|---|
| | Acrylic material | | Polymerization initiator | | Surface conditioner | | |
| | Type | Parts by weight | Type | Parts by weight | Type | Parts by weight | Refractive index ($n_M$) |
| Example 1 | PE3A | 94.5 | 184 | 5 | BYK350 | 0.5 | 1.53 |
| Example 2 | PE3A | 94.5 | 184 | 5 | BYK350 | 0.5 | 1.53 |
| Example 3 | PE3A | 94.5 | 184 | 5 | BYK350 | 0.5 | 1.53 |
| Example 4 | PE3A | 94.5 | 184 | 5 | BYK350 | 0.5 | 1.53 |
| Example 5 | PE3A | 94.5 | 184 | 5 | BYK350 | 0.5 | 1.53 |
| Example 6 | PE3A | 94.5 | 184 | 5 | BYK350 | 0.5 | 1.53 |
| Example 7 | PE3A | 94.5 | 184 | 5 | BYK350 | 0.5 | 1.53 |
| Example 8 | PE3A | 94.5 | 184 | 5 | BYK350 | 0.5 | 1.53 |
| Example 9 | PE3A | 94.5 | 184 | 5 | BYK350 | 0.5 | 1.53 |
| Comparative example 1 | PE3A | 94.5 | 184 | 5 | BYK350 | 0.5 | 1.53 |
| Comparative example 2 | PE3A | 94.5 | 184 | 5 | BYK350 | 0.5 | 1.53 |
| Comparative example 3 | PE3A | 94.5 | 184 | 5 | BYK350 | 0.5 | 1.53 |

PE3A: Pentaerythritol triacrylate,
184: IRGACURE 184

TABLE 1B

| | Particles | | | Average thickness of anti-glare layer (H) |
|---|---|---|---|---|
| | Material | Refractive index ($n_A$) | Parts by weight | |
| Example 1 | PMMA/styrene | 1.52 | 10.0 | 7.4 |
| Example 2 | PMMA/styrene | 1.51 | 5.0 | 5.6 |
| Example 3 | PMMA/styrene | 1.51 | 6.0 | 6.2 |
| Example 4 | PMMA/styrene | 1.52 | 3.0 | 4.7 |
| Example 5 | PMMA/styrene | 1.57 | 1.5 | 4.7 |
| Example 6 | PMMA/styrene | 1.51 | 1.0 | 3.5 |
| Example 7 | PMMA/styrene | 1.54 | 1.5 | 11.7 |
| Example 8 | PMMA/styrene | 1.54 | 0.5 | 8.2 |
| Example 9 | PMMA/styrene | 1.52 | 19.0 | 10.4 |
| Comparative example 1 | PMMA/styrene | 1.51 | 12.0 | 9.0 |
| Comparative example 2 | PMMA/styrene | 1.52 | 3.0 | 5.5 |
| Comparative example 3 | PMMA/styrene | 1.51 | 8.0 | 6.4 |

PMMA/styrene: Methyl methacrylate-styrene copolymer

The anti-glare films obtained in <Example 1> to <Example 9> and <Comparative example 1> to <Comparative example 3> were measured the haze and the average interval between concavities and convexities (Sm) in a way described below and evaluated with respect to anti-reflection properties, contrast and anti-glare properties.

<Haze (Hz)>

The haze of the anti-glare layer of the anti-glare films was measured in accordance with JIS (Japanese industrial standard)-K7105-1981 using a haze meter (NDH2000 made by Nippon Denchoku Industries Co., Ltd.).

<Average Interval Between Concavities and Convexities (Sm) on the Surface>

The measurement (Cut off=0.8 mm, Evaluation length=2.4 mm, and Scanning rate=0.2 mm/sec.) was performed in accordance with JIS (Japanese industrial standard)-B0601-1981 using a precision microfigure measuring instrument (SURFCORDER ET4000A made by Kosaka Laboratory Ltd.).

<Anti-Reflection Property>

The anti-glare films obtained in the examples and the comparative examples were stuck to a black plastic plate with tackiness agent and visually observed from a point 1 meter away. Evaluation criteria were: "double circle" when the observer's face is not reflected on the film, "a circle" when the observer's face is slightly reflected on the film, and "a cross" when the observer's face is apparently reflected on the film.

<Contrast>

The anti-glare films obtained in the examples and the comparative examples were stuck to an LCD monitor (FTD- W2023ADSR made by BUFFALO Inc.) and luminances of the LCD during white image display (white luminance) and during black image display (black luminance) were measured by a luminance meter (LS-100 made by Konica Minolta Inc.). The contrast was calculated by dividing the white luminance by the black luminance. The measurement was performed under a dark room environment and a light room environment, in which the illuminance at measurement part was adjusted to 200 lx, respectively. Evaluation criteria were: "a circle" when a fall rate of the luminance in a state in which the anti-glare film was stuck on the LCD from that in a state in which no anti-glare film was stuck to the LCD was within 1% (black luminance) and within 40% (white luminance), and "a cross" when the fall rate of the luminance was over 1% (black luminance) or over 40% (white luminance).

<Glare>

A glass plate on which an 80-120 ppi of black matrix (BM) pattern was formed was arranged on a light table, which has a built-in fluorescent lamp. Subsequently, onto this BM, a glass substrate on which an anti-glare film was pasted was arranged in such a way that the anti-glare layer is arranged on the observer's side and the glare of the anti-glare film was evaluated. Evaluation criteria were: "a circle" if the maximum BM resolution at which the glare appears clearly was 150 ppi or higher, and "a cross" if the maximum BM resolution was less than 150 ppi.

Table 2A and 2B show the results of the haze (Hz), the average interval between concavities and convexities (Sm) (on the surface), the contrast, the glare, and the anti-reflection property of the anti-glare films obtained in the examples and comparative examples. In addition, the difference ($|n_A-n_M|$) between the refractive index of the particles ($n_A$) and the refractive index of the binder matrix ($n_M$), the average thickness of the anti-glare layer (H), and the particles content are also noted.

TABLE 2A

| | Haze (Hz) [%] | Average interval between concavities and convexities (Sm) [μm] | Difference $|n_A - n_M|$ | Average thickness of anti-glare layer (H) [μm] | Particles content [Parts by weight] |
|---|---|---|---|---|---|
| Example 1 | 3.1 | 38 | 0.01 | 7.4 | 10.0 |
| Example 2 | 2.7 | 15 | 0.02 | 5.6 | 5.0 |
| Example 3 | 3.6 | 142 | 0.02 | 6.2 | 6.0 |
| Example 4 | 2.5 | 39 | 0.01 | 4.7 | 3.0 |
| Example 5 | 3.4 | 50 | 0.04 | 4.7 | 1.5 |
| Example 6 | 2.7 | 80 | 0.02 | 3.5 | 1.0 |
| Example 7 | 4.0 | 112 | 0.01 | 11.7 | 1.5 |
| Example 8 | 1.8 | 48 | 0.01 | 8.2 | 0.5 |
| Example 9 | 4.8 | 38 | 0.01 | 10.4 | 19.0 |
| Comparative example 1 | 6.2 | 50 | 0.02 | 9.0 | 12.0 |
| Comparative example 2 | 2.0 | 5 | 0.01 | 5.5 | 3.0 |
| Comparative example 3 | 4.8 | 165 | 0.02 | 6.4 | 8.0 |

TABLE 2B

| | Contrast | Glare | Anti-reflection property |
|---|---|---|---|
| Example 1 | ○ | ○ | ⊚ |
| Example 2 | ○ | ○ | ○ |
| Example 3 | ○ | ○ | ⊚ |
| Example 4 | ○ | ○ | ○ |
| Example 5 | ○ | ○ | ⊚ |
| Example 6 | ○ | ○ | ○ |
| Example 7 | ○ | ○ | ⊚ |
| Example 8 | ○ | ○ | ○ |
| Example 9 | ○ | ○ | ⊚ |
| Comparative example 1 | x | ○ | ⊚ |
| Comparative example 2 | ○ | ○ | x |
| Comparative example 3 | ○ | x | ⊚ |

The anti-glare films of <Example 1> to <Example 9> of the present invention had a higher contrast and stronger anti-glare property than the anti-glare films of <Comparative example 1> to <Comparative example 3>.

What is claimed is:

1. An anti-glare film comprising:
   a transparent substrate; and
   an anti-glare layer,
   said anti-glare layer being formed on said transparent substrate and having concavities and convexities on the surface, a haze of said anti-glare layer being in the range of 1.0-5.0%, and an average interval between said concavities and convexities (Sm) on said surface of said anti-glare layer being in the range of 10-150 μm, wherein
   said anti-glare layer includes binder matrix and particles, a difference ($|n_A-n_M|$) between a refractive index of said particles ($n_A$) and a refractive index of said binder matrix ($n_M$) being 0.04 or less, wherein
   said anti-glare layer includes said particles by a ratio in the range of 0.5-20.0 parts by weight relative to 100 parts by weight of said binder matrix, wherein
   an average thickness (H) of said anti-glare layer is in the range of 3-12 μm, wherein
   said binder matrix includes a material which is made from an acrylic material by curing by ionizing radiation, and wherein
   said particles consist of styrene-methyl methacrylate copolymer.

2. The anti-glare film according to claim 1, wherein said haze of said anti-glare layer is in the range of 1.8-4.8%, and said average interval between said concavities and convexities (Sm) on said surface of said anti-glare layer is in the range of 15-142 μm, said difference ($|n_A-n_M|$) is in the range 0.01-0.04, said anti-glare layer includes said particles by a ratio in the range of 0.5-19.0 parts by weight relative to 100 parts by weight of said binder matrix, and said average thickness (H) of said anti-glare layer is in the range of 3.5-11.7 μm.

3. An LCD comprising:
   the anti-glare film according to claim 2;
   a first polarizing plate;
   a liquid crystal cell;
   a second polarizing plate; and
   a backlight unit, wherein
   said anti-glare layer is arranged on a surface of an observer's side.

4. A polarizing plate comprising:
   the anti-glare film according to claim 2;
   a polarizing layer; and
   a second transparent substrate, wherein said polarizing layer and said second transparent substrate are arranged on the other side of said an glare film from the side on which said anti-glare layer is formed.

5. An LCD comprising:
the polarizing plate according to claim 4;
a liquid crystal cell;
a second polarizing plate; and
a backlight unit, wherein
said anti-glare layer is arranged on a surface of an observer's side.

* * * * *